United States Patent [19]

Panson et al.

[11] Patent Number: 4,842,812

[45] Date of Patent: Jun. 27, 1989

[54] REACTOR COOLANT CRUD CONTROL BY PARTICULATE SCAVENGING AND FILTRATION

[75] Inventors: Armand J. Panson, Pittsburgh, Pa.; Michael Troy, Augusta, Ga.

[73] Assignee: Westinghouse Electric Corp., Pittsburgh, Pa.

[21] Appl. No.: 95,076

[22] Filed: Sep. 11, 1987

[51] Int. Cl.$^4$ ............................................. G21C 19/30
[52] U.S. Cl. ..................................... 376/306; 376/315
[58] Field of Search ................ 376/306, 305, 315, 310, 376/313; 252/631, 626

[56] References Cited

U.S. PATENT DOCUMENTS

| | | | |
|---|---|---|---|
| 4,594,215 | 6/1986 | Panson et al. | 376/315 |
| 4,720,422 | 1/1988 | Higuchi et al. | 376/313 |
| 4,756,874 | 7/1988 | Ruiz et al. | 376/306 |
| 4,759,900 | 7/1988 | Peterson et al. | 376/306 |

FOREIGN PATENT DOCUMENTS

| | | | |
|---|---|---|---|
| 0133695 | 10/1981 | Japan | 376/313 |
| 0113391 | 7/1982 | Japan | 376/305 |
| 0192899 | 11/1982 | Japan | 376/315 |
| 2095498 | 5/1987 | Japan | 376/305 |

OTHER PUBLICATIONS

P. Beslu, G. Frejaville, *Occupational Radiation Exposure at French Power Plants: Measurement and Prediction*, Nuclear Technology, vol. 44, Jun., 1979, pp. 84–90.

M. Troy, S. Kang, G. T. Zirps, D. W. Koch, *Effect of High-Temperature Filtration on PWR Plant Radiation Fields*, pp. 633–647 in the book "Decontamination and Decommissioning of Nuclear Facilities", M. M. Osterhout, editor, Plenum Press, New York, 1980.

S. Kang, Y. Solomon, M. Troy, *Reactor Coolant High--Temperature Filtration: Evaluation of Effectiveness in Reducing Occupational Radiation Exposure*, Electric Power Research Institute (EPRI) Report NP-3372, vol. 2, Research Project 1445-2 (May, 1984).

A. J. G. Maroto, M. A. Blesa, S. I. Passaggio, A. E. Regazzoni, *Colloidal Interactions on the Deposition of Magnetite Particles on the Fuel Elements Surface*, Water Chemistry II, BNES, 1980, paper 36.

E. J. Moska, W. T. Bourns, *High Flow, High Temperature Magnetic Filtration of the Primary Heat Transport Coolant of the CANDU Power Reactors*, Water Chemistry, BNES, 1977, paper 37.

J. A. Oberteuffer, *Magnetic Separation: A Review of Principles, Devices, and Applications*, IEEE Trans. on Magnetics, vol. Mag-10, No. 2, (Jun. 1974).

C. de Latour, *Magnetic Separation in Water Pollution Control*, IEEE Trans. on Magnetics, vol. Mag-9, No. 3, Sep. 1973.

S. Okamato, *Iron Hydroxides as Magnetic Scavengers*, IEEE Trans. on Magnetics, May 10, 1974.

M. Troy et al., *Study of Magnetic Filtration Applications to the Primary and Secondary Systems of PRW Plants*, EPRI Final Report, NP 514, May, 1978.

*Primary Examiner*—Brooks H. Hunt
*Assistant Examiner*—Daniel Wasil

[57] ABSTRACT

Colloidal corrosion products which are referred to as crud are removed from nuclear reactor coolant streams by suspending zirconium oxide particles in the coolant stream. The crud will be attracted to the surfaces of the zirconia particles and caused to agglomerate thereon. Such zirconia/crud agglomerates may be readily filtered from the coolant. By providing scavenger particles which comprise active areas of zirconia on basically magnetite particles, after the crud is agglomerated to the active zirconia surfaces, the agglomerates may be removed from the coolant utilizing magnetic separation principles.

17 Claims, 1 Drawing Sheet

REACTOR COOLANT CRUD CONTROL BY PARTICULATE SCAVENGING AND FILTRATION

BACKGROUND OF THE INVENTION

Field of the Invention

The present invention relates to the removal of suspended solids from liquid streams and in particular to the removal of colloidal corrosion products from nuclear reactor coolant streams.

In the operation of power plants, a maintenance problem exists due to the presence of corrosion products which form in the plant cooling system and which are then deposited on the surfaces of the cooling system. The problem is particularly acute in nuclear power plants wherein deposited primary cooling system corrosion products are a source of radiation exposure to operating and maintenance personnel and contribute to the high cost of maintenance of such power plants. The primary cooling system corrosion products are generally solids which are produced principally by the corrosion of the steam generator tubes and to a lesser extent by corrosion of the other stainless steel plant surfaces.

The corrosion product components circulate with the primary coolant, both as a suspended or insoluble solid phase and to some extent as ions in solution. The solid phase particles deposit on the reactor core surface where they become irradiated. After being irradiated, the solid phase particles become resuspended in the primary coolant solution and are thereafter deposited on plant surfaces away from the core where the irradiated solid phase particles are the most important source of radiation exposure to personnel in the power plant.

In a pressurized water reactor (PWR) nuclear power plant, both the primary and secondary coolant streams carry a burden of insoluble magnetic corrosion products. These corrosion products also carry a surface charge, generally dependent on the pH of the coolant and, at least in the smaller particle sizes, are subject to electrostatic attraction which causes particles to adhere to the surfaces of the system.

The primary cooling system corrosion products are largely nickel ferrite and a nickel ferrite composition wherein cobalt, manganese and other elements have been substituted for part of the nickel. Substitution of chromium for ferric iron in the corrosion products has also been indicated. Such corrosion products have become colloquially known as crud.

It has been recognized in the literature that by far the major source (i.e., 70 to 90%) of occupational radiation exposure to the operators and maintenance personnel of nuclear power plants is the gamma radiation emanating from deposits of irradiated corrosion products which are ubiquitously distributed on the primary coolant system surfaces. In this connection, reference is made to a publication of Beslu et al. (P. Beslu and G. Frejaville, *Occupational Radiation Exposure at French Power Plants: Measure and Prediction*, Nuclear Technology, Vol. 44, pp. 84–90 (June, 1979)) and to a publication of Troy et al. (M. Troy, S. Kang, G. T. Zirps and D. W. Koch, *Effect of High-Temperature Filtration on PWR Plant Radiation Fields* in the book "Decontamination and Decommissioning of Nuclear Facilities", M. M. Osterhout editor, Plenum Press, New York, (1980)). Such corrosion products, or crud, are released from surfaces, transported as small particles and colloids to and deposited on the reactor fuel elements where they are activated by the neutron flux. The crud is then resuspended and transported as particles back to the other system surfaces. The chemistry of the reactor coolant and the electric charge of the surfaces, both particle and plant, determine to a large extent the rate of deposition. Other effects such as hydraulic forces and solution phenomena contribute to this distribution. The latter are believed to play only a minor role in the overall process, a situation which was discussed in a publication of Kang et al. (S. Kang, Y. Solomon and M. Troy, *Reactor Coolant High-Temperature Filtration Volume 2: Evaluation of Effectiveness in Reducing Occupational Radiation Exposure*, Electric Power Research Institute (EPRI) Report NP-3372, Volume 2, Research Project 1445-2 (May, 1984)). Accordingly, it is known that these insoluble corrosion products known as crud have an important adverse effect on personnel safety and plant availability and their removal carries a strong economic incentive.

The insoluble magnetic ferrite corrosion products carry a surface charge dependent on the pH of the coolant, see Moroto, et al. (A. J. G. Moroto, M. A. Blesa, S. I. Passagio, and A. E. Regazzoni, *Colloidal Interactions on the Deposition of Magnetite Particles on the Fuel Elements Surface*, Paper No. 36, Conference on Water Chemistry of Nuclear Reactor Systems, Bournemouth, England, (October, 1980)) and in the small particle sizes at least, are subject to electrostatic attraction which causes particles to adhere to the surfaces of the system. In particular the crud deposits on the fuel element cladding. The fuel elements generally have Zircalloy clad surfaces which are further coated with a thin layer of zirconia ($ZrO_2$). The $ZrO_2$ layer influences the deposition rate of the crud due to the natural attraction between the surface electrical charges of the crud and the $ZrO_2$.

Particles suspended in solution acquire surface charges as a consequence of surface hydrolysis reactions and adsorption of ions from the solution. Solution pH most generally controls the polarity and extent of the charge for oxide surfaces. As the particle dimensions become smaller, the surface charge becomes more and more important in determining the properties of the suspended particles. When the particle dimension decreases to between 10 and 100 Å, the suspended solid is referred to as a colloidal particle, and the surface charge becomes the most significant element in determining properties. The stability of suspended particles with respect to flocculation and coagulation or precipitation is determined by the surface charge. The particles move when placed in an electric field and this process is referred to as electrophoresis. The charged particles, as a consequence of their mobility in an applied electric field, may be removed from solution and collected or deposited on an electrode surface. This electrophoretic deposition process is the basis for a significant technology in the industrial coating field, e.g., in depositing thin films of insulating materials, polymer and paint coatings. The electrostatic forces can cause charged particles to adhere to surfaces.

A procedure advanced for the removal of crud from nuclear reactor coolant streams by taking advantage of the magnetic properties of crud is set forth in U.S. Pat. No. 4,594,215, which issued on June 10, 1986 to the present applicants. The magnetic filter of the '215 patent is a successful crud collector; however, the dangers inherent in radiation exposure and the economics of nuclear reactors tend to encourage further searching for still more efficient procedures. The present invention provides such an improved system.

SUMMARY OF THE INVENTION

The improved system presented by the present invention provides a method for decreasing the rate of deposition of colloidal corrosion products from a nuclear reactor coolant onto internal reactor surfaces in contact with the coolant and having surface characteristics that attract such products. The method comprises forming a batch of particles that are suspensible in said coolant and which have active surfaces that possess surface characteristics that attract the crud. Such particles are suspended in the coolant providing a surface upon which the crud products may deposit. In nuclear reactor systems, the particularly vulnerable surfaces are those surfaces of the reactor which are coated with a layer of zirconium oxide. Accordingly, the present invention provides suspensible particles which have active zirconium dioxide surfaces. The particles may preferably be zirconium oxide particles and may be formed by processes comprising oxidizing a zirconium metal sponge, oxidizing a zirconium salt or oxidizing zirconium hydride. Suitable particles may be formed by vacuum sputtering zirconium oxide onto a particulate substrate of a different composition. In a particularly valuable form of the invention, the particulate substrate may have positive magnetic susceptibility and may comprise magnetite. Moreover, as mentioned above, the ferrite crud particles themselves are strongly magnetic. In a preferred form of the invention, the total surface area of the active surfaces should be larger than the area of the reactor surface to be protected, and the overall efficiency of the process is enhanced whenever the total surface area of the active surface provided by the suspended particles is at least about 20 times larger than the area of the reactor surfaces to be protected.

The invention also provides a method for removing colloidal corrosion products from a nuclear reactor coolant. In this aspect of the invention, the method of the invention comprises forming a batch of particles that are suspensible in the coolant and which have surface characteristics that attract the crud products. The particles are suspended in the coolant whereby the crud products deposit on the surfaces of the particles. Thereafter, the particles with the crud products deposited thereon may be removed from the coolant. In one preferred form of the invention, the particles may have magnetic susceptibility and the removing step may comprise magnetically attracting such particles. In another preferred aspect of the invention, the removal step may comprise filtration of the coolant by more conventional means. Manifestly, the method may involve both magnetic attraction and filtration of the coolant stream.

DETAILED DESCRIPTION OF THE PREFERRED EMBODIMENTS

Figures 1, 2:
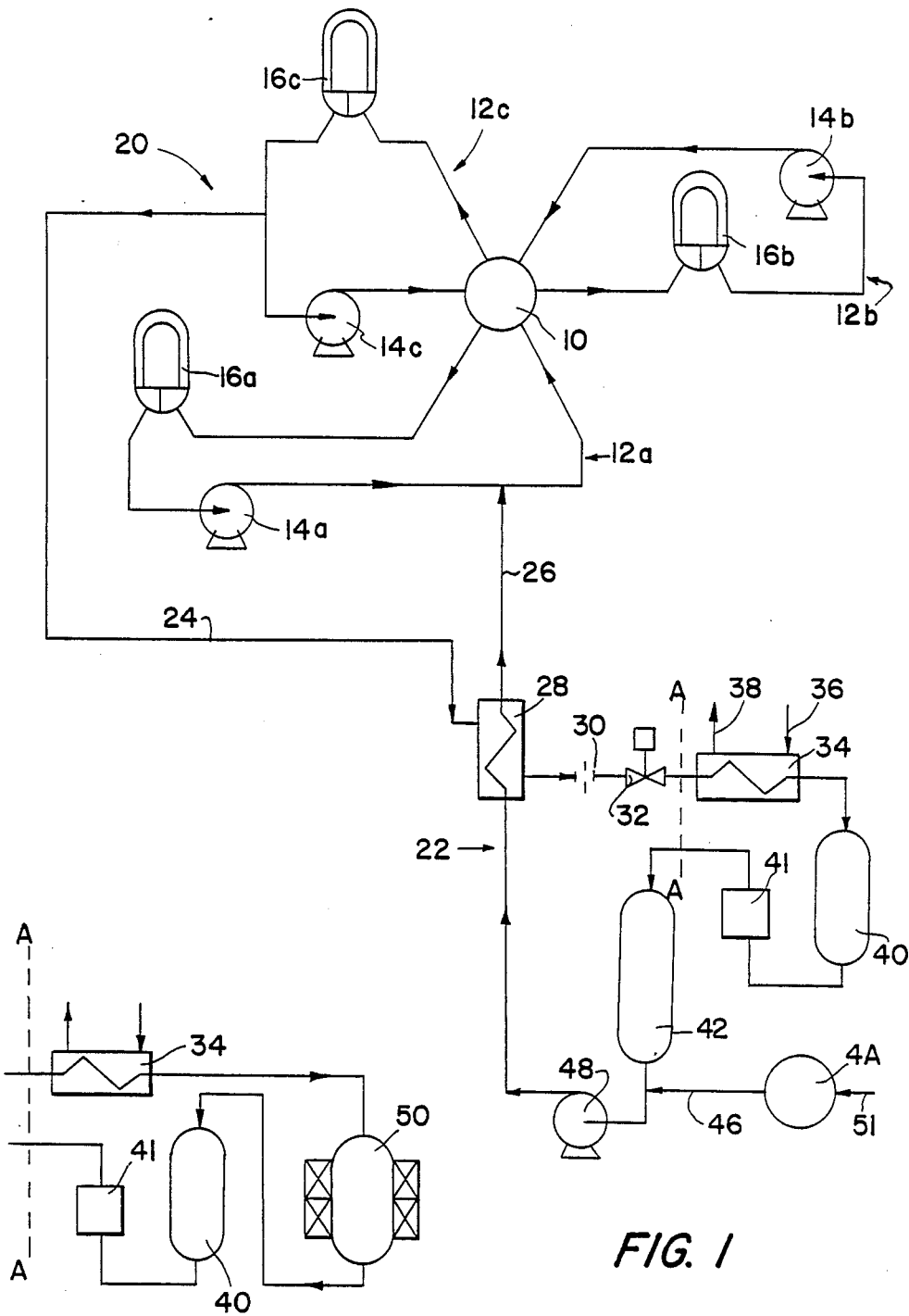
FIG. 1 is a schematic flow diagram illustrating a reactor coolant system which may be protected through the use of the present invention.
FIG. 2 is a partial schematic flow diagram which may be substituted for the portion of the flow diagram of FIG. 1 to the right of the dashed line A—A.

By providing a removable $ZrO_2$ surface of large area relative to the surface area of the fuel elements, much of the colloidal crud can be removed before it deposits on the core or on other plant surfaces. In essence, a $ZrO_2$ surface is introduced into the coolant stream to serve as a getter or scavenger for colloidal crud particles. The resulting aggregate particles are then easily separated from the reactor coolant stream by an appropriate filtration process.

The present method involves the introduction of a relatively large, removable $ZrO_2$ surface into the reactor coolant system (RCS) for the purpose of seeding the RCS with appropriately sized scavenger particles having a large $ZrO_2$ surface area. These particles will be dispersed throughout the reactor coolant and will come into close proximity with the circulating nickel ferrite and magnetite colloids. The crud particles will tend to agglomerate onto the $ZrO_2$ surface and can be removed along therewith. Manifestly, although the present invention is described in terms of zirconium oxide particles and/or zirconium oxide coated particles, in its broad sense the present invention contemplates the use of any sort of particle which is suspensible in the coolant and which has active surfaces that possess surface characteristics which are attractive of the crud. $ZrO_2$ is particularly valuable since it inherently may compete with the $ZrO_2$ coating on the core elements in attracting crud deposition. Another advantage in selecting $ZrO_2$ is that its addition to the Reactor Coolant System (RCS) introduces, no chemical species not already present there.

While the colloidal and near-colloidal crud particles are difficult to filter by conventional means, the larger aggregated crud particles are easily filterable by any one of a number of conventional filtration devices which may be included in the coolant circulation system.

For a more thorough understanding of the coolant system, reference is made to FIGS. 1 and 2 which illustrate preferred systems with which the present invention may be utilized. In FIG. 1, a typical three-loop PWR reactor coolant system (RCS) is schematically illustrated. In FIG. 1, the reactor vessel is designated by the reference numeral 10. The three-loops are designated generally by the reference numerals 12a, 12b and 12c and each includes a respective pump 14a, 14b and 14c which causes the coolant to flow through respective steam generators 16a, 16b and 16c. Coolant is circulated by the pumps 14a, 14b and 14c through the reactor 10 where it is heated by the nuclear reactor core. The coolant then circulates through the steam generators 16a, 16b and 16c where some of its sensible heat is used to boil water on the secondary side of each generator. The coolant then returns to each pump suction in a continuous manner. The loops 12a, 12b and 12c are equivalent and coolant mixes between the three-loops internally of the reactor vessel 10.

All of the internal surfaces of the plant corrode to some extent, releasing crud to the coolant as both soluble and particulate material. The major contribution, by far, comes from the steam generator tubes which represent the bulk of the wetted surface. The crud circulates with the coolant through the core in reactor 10, where, depending on several parameters, it deposits on the core surfaces for a time and is irradiated. The irradiated crud is then released to the coolant and freely circulates through the loops 12a, 12b and 12c until it deposits on relatively cooler plant surfaces, particularly in the steam generators 16a, 16b and 16c. This process continues indefinitely resulting in activation of plant surfaces which are external to the core.

The reactor coolant system (RCS) is designated broadly by the reference numeral 20 in FIG. 1. The RCS is provided with a Chemical and Volume Control System (CVCS) which is designated broadly by the reference numeral 22 in FIG. 1. The CVCS performs several known functions necessary for proper plant operation. As can be seen in FIG. 1, coolant is continually removed from loop 12c via line 24 and is returned to loop 12a via line 26. Heat is exchanged between the coolant being returned to loop 12a via line 26 and the coolant in line 24 which has been withdrawn from the reactor coolant system 20. This heat exchange occurs in a heat exchanger 28 where the coolant in line 24 is relatively cooled and the coolant in line 26 is relatively heated.

After passing through the regenerative heat exchanger 28, coolant from line 24 is directed through a letdown orifice 30 and a control valve 32 and the same is further cooled in a letdown heat exchanger 34. Heat exchanger 34 is provided with cooling water entering through line 36 and exiting by way of a line 38. The cooled stream is then directed through a mixed anion/cation bed demineralizer 40 where the coolant stream is chemically conditioned in a conventional manner. The conditioned coolant is filtered in a conventional filter 41 and the filtered coolant is directed into a volume control tank 42 which again operates in a conventional manner. In this regard, those of ordinary skill in the art to which the present invention pertains will recognize that tank 42 may generally be provided with auxiliary and accessory devices and mechanisms for controlling the volume of coolant in system 20. Moreover, mixed bed demineralizer such as the demineralizer 40 are generally provided in pairs and installed in such a manner that one can be taken out of operation for maintenance and/or restocking with active ingredients while the other continues to treat the coolant. The auxiliary and accessory devices for the volume control tank 42 and the second demineralizer are not shown in FIGS. 1 and 2 for enhanced clarity and simplicity.

The chemical and volume control system 22 may also include a chemical mixing tank 44 where chemical additives may be prepared for addition to CVCS 22 through line 46. After the coolant exits from tank 42 and after additives have been inserted into the coolant through line 46, the treated coolant is pumped by pump 48 back through exchanger 28 and reintroduced into system 20 via line 26.

CVCS 22 thus operates to remove soluble and particulate impurities by filtration and ion exchange in the mixed bed demineralizer 40 in a generally conventional fashion and by conventional filtration on the reactor coolant filter 41. Manifestly, CVCS 22 serves as the makeup system and chemical addition system for RCS 20.

In operation, a fraction of the reactor coolant is bled off from RCS 20 through line 24 and is cooled in exchangers 28 and 34 and depressurized in orifice 30 and valve 32. The cooled and depressured coolant from line 24 is then transported to the demineralizer 40. The demineralized coolant flows through filter 41 and into volume control tank 42 and then back to the suction of charging pump 48. The coolant is pumped by pump 48 through heat exchanger 28 where it is heated and returned to RCS 20 through line 26. Losses in reactor coolant and/or required chemical additive materials are introduced via chemical mixing tank 44 and line 46 where the makeup joins the main flow at the suction of charging pump 48. This is the preferred injection point for the zirconium oxide scavenger material, which may be provided as a slurry in reactor makeup water introduced through line 51.

In operation, colloidal and near-colloidal crud particles are difficult to filter by conventional means; however, the larger $ZrO_2$/crud aggregates may easily be filtered using any one of a number of conventional filtration schemes. The zirconium oxide/crud aggregates may be filtered utilizing the conventional plant letdown filter 41 and the conventional CVCS mixed-bed demineralizer 40. Alternatively, a zirconium oxide filled deep-bed filter may be utilized in place of or in addition to CVCS demineralizer 40. Moreover, with particular reference to FIG. 2, an electromagnetic filter 50 might be employed for removing the zirconium oxide-crud aggregates from the coolant stream since the particles will have magnetic properties, either because the seeding particle is so designed as to be magnetically susceptible or because of the attracted coating of crud particles on the $ZrO_2$ particle surface. In FIG. 2, the schematic diagram illustrates an electromagnetic filter 50 disposed between heat exchanger 34 and demineralizer 40. Otherwise the diagram is the same as shown in FIG. 1. FIG. 2 simply is used in place of the equipment shown to the right of the dashed line A—A in FIG. 1.

With regard to the electromagnetic filter 50 illustrated in FIG. 2, reference is made to the '215 patent mentioned above and to a publication entitled *Study of Magnetic Filtration Applications to the Primary and Secondary Systems of PWR Plants*, M. Troy, et al., EPRI Final Report, NP 514, (May, 1978). the disclosures of which are specifically incorporated herein by reference.

The suspensible particles having active surfaces in accordance with the present invention should be prepared so as to have a large specific surface area and an appropriate particle size. Suitable zirconium oxide particles may be prepared using any one of a number of different methods. Moreover, while known demineralizers useful in connection with CVCS methodology are generally effective in removing colloidal and near-colloidal crud, the agglomerating effect of zirconium oxide will enhance the removal efficiencies available using conventional plant systems. Zirconia has been shown to have ion exchange properties for certain fission products, and to capitalize on this factor and provide an appropriate filter for the zirconium oxide agglomerate particles, a deep-bed zirconium oxide filter could be substituted for one of the two conventional mixed bed ion exchangers normally installed in the CVCS and used in parallel with the deep-bed ion exchanger 40. Alternatively, a separate zirconium oxide deep-bed filter could be placed in series with and upstream from the demineralizer 40. This latter arrangement would protect the mixed bed from being plugged by particulates since the deep-bed zirconia filter would also serve as a filter for the agglomerated particulates.

Useful methods for production of scavenger particles suitable for employment in connection with the present invention include oxidation of zirconium metal sponge with subsequent sizing; vacuum sputtering of zirconia onto a prepared particulate substrate of high specific surface area which, in the application using an electromagnetic filter as the removal technique, might preferably be magnetite; oxidation of zirconium salts under appropriate conditions such as, for example, atomization of salt solution into an air atmosphere at high temperature; and sizing of zirconium hydride, a brittle solid, followed by oxidation. Magnetite particles may also be coated with zirconium oxide using a chemical adsorption technique. In such technique, a zirconium salt is pre-adsorbed onto the surface of magnetite particles and then the coated particles are subjected to controlled surface oxidation to produce a layer of zirconium oxide on the magnetite particles. In this regard, there are many known procedures for coating the surfaces of particles with a surface layer of another substance and thus provide coated particles that are useful for purposes of the present invention. Such procedures are known and are not part of the present invention.

The total zirconium oxide surface area should be relatively large compared to the total area of the clad surface of the fuel elements. The larger the specific surface of the zirconia the better, since less zirconium oxide will then be required. A useful system might employ 10 micron spherical zirconia particles having a typical porous particle specific surface area of 200 sq. meters per gram. A one pound batch of such particles would have a surface area of about $1 \times 10^6$ ft$^2$ whereas the typical core surface area in a conventional reactor is about $6 \times 10^4$ ft$^2$. Accordingly, a $6 \times 10^{-2}$ lb batch of particles will have a surface area which is equivalent to a typical core surface area. The volume of coolant in a typical RCS application is about $1.3 \times 10^4$ ft$^3$, and accordingly, the concentration of zirconia particles to provide a surface area which is 20 times larger than the core area is approximately 2 ppm. Moreover, a 1.2 lb batch of zirconia particles will thus provide a surface area which is about 20 times as large a the surface area of the core. As will be apparent to those skilled in the pertinent art, zirconia coated magnetite particles having comparable surface area characteristics may generally be slightly lighter than solid zirconia particles.

Although, in the practice of the present invention, the point where the particles are added to the coolant is not critical, a convenient point is simply to add the particles to tank 44 as a concentrated suspension. Such suspension may then be flushed by makeup water directly into the suction of pump 48.

Agglomeration of the crud particles onto attracting scavenger particles will enhance the ability to filter the crud using any of the methods discussed above. Moreover, the use of a high-flow high-temperature filtration process may one day be particularly attractive since the removal rate should be significantly greater than that which is available through the use of the CVCS 22 circuit. Such high-flow high-temperature filtration processes employing an electromagnetic filter (EMF) to remove small nickel ferrite and magnetite crud particles directly has been previously proposed by M. Troy et al., *Effects of High-Temperature Filtration on PWR Plant Radiation Fields*, supra and by Moskal et al. (E. J. Moskal and W. T. Bourns, High-Flow, High Temperature Magnetic Filtration on the Primary Heat Transport Coolant of the CANDU Power Reactors, Paper No. 37, in Proceedings of Conference on Water Chemistry of the Nuclear Reactor System, Bournemouth, England (October, 1978)). The zirconium oxide particle seeding process of the present invention should not only enhance the effectiveness of the EMF, but should make the use of any high-temperature backflushable mechanical filter practical. Although hightemperature high-pressure filtration might one day prove to be the best procedure, today the use of such procedure would require expensive retrofitting of existing plants and generally is therefore contraindicated. Thus, at present, filtration in the CVCS may offer a more practical solution.

The PWR plant letdown filter 41, as utilized in conventional application, is generally designed to filter particles larger than 25 microns in size. Accordingly, such filters are not effective for removing typical crud particles. The agglomerating action of the zirconium oxide particles, in accordance with the present invention, will thus enhance the effectiveness of filters such as filter 41.

With regard to electromagnetic particle trapping, Oberteuffer (J. A. Oberteuffer, *Magnetic Separation: A Review of Principles, Devices and Applications*, IEEE Transactions on Magnetics, Vol. Mag-10, No. 2, (June, 1974)) has shown that to obtain the optimum effect of a magnetic filter on small paramagnetic particles, the EMF matrix element radius should be approximately three times the particle radius. Obviously for practical magnetic filter matrices, the approach to optimum design falls off as the radius of the target particles decreases. For submicron (near-colloidal) fractions of the primary corrosion product, magnetic filters tend to become less effective. Particles with strongly positive magnetic susceptibility, for example, magnetite, nickel ferrite, etc., are acted upon by the EMF magnetic gradient to produce an attractive magnetic force which competes with the fluid drag forces. If the magnetic force is dominant, the particle will be trapped. Since hydraulic drag is a function of the second power of the particle radius, whereas magnetic attractive force depends on the third power of the radius (i.e, particle volume), a point will be reached, as particle size is reduced, where drag force becomes dominant. By collecting the small crud particles on the surfaces of larger coated magnetic particles, the effective critical trapping particle radius may thus be considerably reduced and magnetic attractive force caused to become dominant.

Magnetite has a saturation magnetization of approximately 90 emu/gm. Zirconium dioxide is diamagnetic (i.e., repulsed by a magnetic gradient) with a magnetic susceptibility of $-1 \times 10^{-7}$ emu/gm. Under a magnetic field of $4 \times 10^3$ oersteds (sufficient to saturate magnetite) the magnetization of zirconia would be $-4 \times 10^{-4}$ emu/gm. Accordingly, since the duplex magnetite/ZrO$_2$ particle will be mostly magnetite, the attraction of the magnetite particle by the EMF will be essentially unaffected by the zirconia coating. Furthermore, since the crud particles themselves have magnetic characteristics, even the simple zirconia particles, once coated with agglomerated crud, will have acquired sufficiently strong magnetic characteristics to be trapped by a magnetic filter.

Periodically a magnetic filter will be isolated from the coolant system to allow off-loading of the collected corrosion products to waste disposal. When the filter has been isolated, the matrix is demagnetized and the filter backflushed. Without the magnetic forces on the particles the fluid drag is sufficient to entrain the particles thus removing them from the matrix.

We claim:

1. A method for decreasing the rate of deposition of colloidal corrosion products from a nuclear reactor coolant onto an internal reactor surface in contact with the coolant and having surface characteristics that attract such products said method comprising:

providing a batch of particles that are suspensible in said coolant and which have active surfaces that possess surface characteristics that attract said corrosion products; and suspending said particles in said coolant whereby said corrosion products deposit on the surfaces of the particles.

2. A method as set forth in claim 1 wherein said reactor surface and said active particle surfaces comprise zirconium dioxide.

3. A method as set forth in claim 2 wherein said particles are of zirconium oxide.

4. A method as set forth in claim 3 wherein said forming step comprises oxidizing a zirconium metal sponge.

5. A method as set forth in claim 3 wherein said forming step comprises oxidizing a zirconium salt.

6. A method as set forth in claim 3 wherein said forming step comprises oxidizing a zirconium hydride.

7. A method as set forth in claim 2 wherein said forming step comprises vacuum sputtering zirconium oxide onto a particulate substrate.

8. A method as set forth in claim 7 wherein said particulate substrate comprises a material having magnetic susceptibility.

9. A method as set forth in claim 8 wherein said material comprises magnetite.

10. A method as set forth in claim 1 wherein the total surface area of said active surfaces is larger than the area of said reactor surface.

11. A method as set forth in claim 10 wherein the surface area of the active surfaces is at least 20 times larger than the area of said reactor surface.

12. A method for removing colloidal corrosion products from a nuclear reactor coolant comprising:

providing a batch of particles that are suspensible in said coolant and which have surface characteristics that attract said corrosion products;

suspending said particles in said coolant whereby said corrosion products deposit on the surfaces of said particles; and removing said particles and the corrosion products deposited thereon from said coolant.

13. A method as set forth in claim 12 wherein said particles have magnetic susceptibility and said removing step comprises magnetically attracting said particles.

14. A method as set forth in claim 12 wherein said particles have acquired magnetic susceptibility as a result of agglomeration of said corrosion products thereon and said removing step comprises magnetically attracting said composite particles and corrosion products.

15. A method as set forth in claim 12 wheren said removing step comprises filtering said coolant.

16. A method as set forth in claim 13 wherein said removing step comprises filtering said coolant.

17. A method as set forth in claim 14 wherein said removing step comprises filtering said coolant.

* * * * *